Patented Feb. 14, 1933

1,897,393

UNITED STATES PATENT OFFICE

WILLIAM J. LIVINGSTON, OF CHICAGO, ILLINOIS, ASSIGNOR TO LIVINGSTON COFFEE CO., OF CHICAGO, ILLINOIS, A CORPORATION OF ILLINOIS

IMPROVED COFFEE AND ITS MANUFACTURE

No Drawing.    Application filed April 19, 1930.    Serial No. 445,829.

My invention relates to the improving of ground coffee so that the beverage from it will automatically be clarified and enhanced in its aroma, and so that a smaller proportion of cream will be required to satisfy the average consumer of the beverage.

When coffee beans are ground in the usual manner, the major portion of each bean is reduced to granules. However, the grinding also produces a relatively smaller amount of fibrous particles which are of lower specific gravity than the kernel of the coffee bean and which perhaps are formed from the husk of that kernel. Some of these fibrous particles are usually of such small diameter that they will pass through a bag supporting the coffee in the upper portion of a coffee urn or coffee percolator, and because of their relative lightness these particles tend to remain suspended in the water which has percolated through the bag, so that the resulting beverage will not be clear. Or, if the ground coffee is placed directly in the urn or coffee pot without being encased in a bag, such relatively light particles will be raised off the bottom of the utensil by the convection currents in the water, so that they will similarly remain suspended in the liquid.

To overcome the resulting turbidity and unattractive appearance of the beverage, it has been customary to some extent to clarify the beverage by adding the white (or albumen) of one or more eggs to it at a certain stage during the preparation of the beverage. However, this requires additional attention by the person preparing the beverage and is only effective for clarifying the beverage if the liquid is instantly and effectively stirred to intermingle the egg albumen thoroughly with the liquid.

In practice, the egg ingredient usually coagulates before it has affected any considerable portion of the liquid, so that the just recited procedure does not effectively clarify the beverage even when the amount of the egg albumen was theoretically ample for that purpose. This is particularly true with large coffee urns, such as are used by restaurants and hotels, since both the difficulty of reaching the liquid in the urn and the large liquid capacity of such urns make it impossible for the user to mix the egg albumen quickly with such a quantity of water. Consequently, the coffee usually served in hotels and restaurants as well as homes is unclarified, thereby requiring the addition of a larger proportion of cream (to secure the change of color and the aroma desired by most coffee drinkers) than would be needed if the beverage had been adequately clarified.

In some of its major objects, my invention aims to provide roasted and ground coffee having a clarifying ingredient so attached thereto and distributed therein that the mere brewing or steeping of the coffee will produce a beverage which will be completely clarified and which will require much less cream than unclarified beverage coffee to satisfy the average user as to both the color and the aroma of the beverage.

In another major object, my invention aims to provide a simple and inexpensive procedure for manufacturing ground coffee having a suitably distributed clarifying ingredient attached thereto, so that the resulting product will serve as a self-clarifying coffee.

In accomplishing the purposes of my invention, I employ desiccated egg albumen as the clarifying ingredient. This is commercially available in the form of a dry powder, but would not be suitable for the recited purpose when merely intermingled with the ground coffee (or added to the water separately from the ground coffee) because its effect then will pervade only a small part of the liquid beverage.

To insure a complete dissemination of the desiccated and powdered albumen in the resulting beverage, I first mingle a suitable proportion of this egg albumen (such as approximately two and one-third percent by weight of the dry coffee) with the coarsely ground roasted coffee. The mixture is then agitated and intermingled in a mixer. During this agitation, the powdered albumen is rubbed into the coffee granules and adheres to these granules to form white streaks, spots on some of the granules. However, owing to the quite small proportion of the albumen to the coffee, the greater portion of the coffee granules will still be free of albumen after the mixing operation is completed, while thick particles of albumen will be found adhering to other coffee granules, so that an inadequate relative distribution of the albumen and the coffee would be produced in the resulting beverage.

To enhance the proportionate distribution of the albumen, I then subject the entire batch to another grinding operation to reduce the size of the granules, and thereafter agitate the reground mixture again in a mixer. During the regrinding, the albumen adhering to some of the previously larger coffee granules is cut up, rubbed over and forced into newly cut surfaces in the smaller granules, and also is spread over other granules both by the action of the cutting knives in transmitting some of the albumen and by the rubbing of previously uncoated coffee granules against those to which albumen already adhered.

During the subsequent remixing, the rubbing of other coffee granules against the already thinly spread albumen (on the granules to which the albumen has attached itself) distributes albumen to a larger proportion of the coffee granules and also intermixes the albumen-carrying granules with those to which no albumen is attached, so that I secure a fairly uniform distribution of the albumen among the coffee. Consequently, as soon as the resulting mixture is wet in the bag of a coffee urn, the albumen momentarily acts as an adhesive for causing adjacent minute or slender particles to stick to larger granules of the coffee, thereby preventing these minute or slender particles from passing quickly through the bag in the heretofore customary manner. Then, as soon as the coffee granules are saturated with the hot water, these formerly hard granules soften and pack tightly, so as to grip the more minute or slender coffee particles between them, thereby still retaining the major portion of these particles in the bag while the continued percolation of the hot water through the bag carries the albumen with it.

If no bag is employed in the coffee-making receptacle, the momentary adhesive action of the albumen (when this is initially moistened) acts similarly in preventing coffee particles of lighter specific gravity than the main coffee granules from floating up into the liquid, after which the packing of the coffee (as it becomes saturated with water) similarly wedges these lighter particles among the so-called coffee grounds, from which the palatable constituents of the coffee and the albumen are then extracted in intermingled form. Consequently, my partial albumen-coating of the coffee serves the same double purpose regardless of the manner in which the coffee is made, by keeping the beverage clarified and by enchancing the aroma of the beverage through the addition of the egg albumen.

Since my manufacturing procedure is performed with both the coffee and the egg albumen in dry form, there is no deterioration in the quality of the coffee, and my said procedure produces an improved ground coffee which can readily be stored and shipped either in bags or in cans in the usual manner, as it is entirely dry. When used in place of ordinary ground coffee, it produces a clear liquid in which the flavor of the coffee is enhanced by the presence of the albumen, without requiring special manipulation of any kind.

Owing to this automatic clarifying of the beverage, a much smaller proportion of cream suffices for changing the color of the beverage to the lighter tint generally desired by those who take cream in their coffee, so that the saving in the cost of the cream is many times greater than the cost of treating the coffee beans according to my invention. Consequently, my invention enables the coffee roaster to supply any given grade of coffee with an improvement of its aroma and with a decided saving to the user for the cost of the beverage.

In practice, I have found my invention to effect a complete and automatic clarifying of the resulting beverage when the weight of the albumen which is affixed to and distributed among the granulated coffee is about two and one-third percent of the initial weight of the graulated coffee. This small percentage of admixture does not appreciably reduce the strength of the beverage, but improves the aroma both for black coffee and for coffee taken with cream, so that my invention is of an advantage in either case.

However, while I have found the just recited percentage preferable when starting with a widely used grade of medium roasted coffee (namely, coffee beans roasted until their weight shrinks about fifteen percent), the advisable percentage of the albumen to the total amount of coffee with which it is associated would obviously be somewhat higher if the coffee had been roasted to eliminate still more of its moisture content, and the percentage would be lower if the coffee had been roasted to a lesser extent. Hence I do not wish to be limited to the precise proportions above recited. Moreover, the proportion of the egg albumen required for securing my improvement in the coffee beverage is so small that this can readily be affixed in the above described manner to a small fraction of the total granules of the coffee for which this albumen suffices. For this reason, my invention can also be employed by first attaching a given quantity of the desiccated egg albumen to a small portion of the ground coffee for which it will suffice, and thereafter intermixing this albumen-carrying coffee with a sufficient quantity of ground coffee (free of albumen) to make up the proper proportion. Hence it is to be understood that my invention also includes the providing of ground roasted coffee having much higher percentages of egg albumen attached thereto, since the thus improved coffee can readily be intermingled with untreated coffee by any one who has facilities for this intermixing.

Nor do I wish to be limited to a manufacturing procedure which includes both the regrinding and the remixing, although I found the double grinding and the double mixing to give the most advantageous results, since it not only adds uniformity to the entire batch but also distributes the albumen in such exceedingly thin film portions as to insure a substantially simultaneous admixture of all of the albumen with the water of the beverage.

I claim as my invention:

1. Roasted coffee in the form of dry coffee granules having desiccated egg albumen attached to portions of granules, the total weight of the albumen being approximately two and one-third percent of the weight of the coffee granules.

2. Roasted coffee in the form of dry coffee granules having approximately two and one-third percent of their total weight of dry desiccated egg albumen deposited in the form of thin coatings on surface portions of the granules.

3. Roasted coffee in the form of coffee granules having approximately two and one-third percent of their total weight of desiccated egg albumen in the form of thin films on surface portions of some of the granules.

4. The method of manufacturing a solid ingredient for preparing a self-clarifying coffee, which consists in intermingling coarsely ground and dry roasted coffee beans with less than one-fortieth of their weight of desiccated egg albumen, and regrinding the resulting mixture.

5. The method of manufacturing a solid ingredient for preparing a self-clarifying coffee, which consists in intermingling coarsely ground and dry roasted coffee beans with approximately two percent of their weight of desiccated egg albumen, regrinding the resulting mixture, and thereafter intimately mixing the product of the regrinding.

6. The method of manufacturing the solid ingredient for a self-clarifying coffee, which consists in agitating coarsely ground roasted dry coffee beans together with approximately two percent of their weight of desiccated egg albumen for a sufficient extent to cause all of the albumen to be distributed as coatings adhering to surface portions of coffee granules, and then regrinding the granules to effect a further distribution of the albumen among the coffee and to produce smaller granules.

7. The method of manufacturing the solid ingredient for a self-clarifying coffee, which consists in agitating coarsely ground roasted dry coffee beans together with a relatively small proportion of their weight of desiccated egg albumen for a sufficient extent to cause all of the albumen to be distributed as coatings adhering to portions of the coffee granules, then regrinding the granules to effect a further distribution of the albumen among the coffee and to produce smaller granules, and thereafter intimately mixing the said smaller granules.

8. The method of manufacturing the solid ingredient for a self-clarifying coffee, which includes the rubbing of desiccated and powdered egg albumen upon dry granules of roasted coffee beans to distribute the albumen entirely in the form of film-like portions on surface portions of the granules.

9. The method of manufacturing the solid ingredient for a self-clarifying coffee, which includes the rubbing of desiccated and powdered egg albumen upon dry granules of roasted coffee beans to distribute the albumen as film-like coatings on surface portions of the granules, and the subsequent regrinding of the said granules to produce smaller granules and to redistribute part of the albumen.

10. The method of manufacturing the solid ingredient for a self-clarifying coffee, which includes the rubbing of desiccated and powdered egg albumen upon granules of roasted coffee beans, and the subsequent regrinding and remixing of the said granules.

11. As a new article of manufacture, a mixture of roasted coffee granules, a portion of the said granules having as their sole admixture desiccated egg albumen attached only to surface portions of these granules and the remaining coffee granules being free of albumen, the total weight of the albumen being between one and one-half percent and two and one-half percent of the total weight of the coffee in the granules.

Signed at Chicago, Illinois, April 18th, 1930.

WILLIAM J. LIVINGSTON.